United States Patent
Brescia et al.

[15] 3,641,568
[45] Feb. 8, 1972

[54] KEYBOARD FOR CALCULATING MACHINES, TELEPRINTERS, TERMINALS AND THE LIKE

[72] Inventors: Riccardo Brescia, Ivrea; Lucio Montanari, Cascinette d'Ivrea, both of Italy

[73] Assignee: Ing. C. Olivetti & C., S.p.A., Ivrea, Turin, Italy

[22] Filed: Aug. 31, 1970

[21] Appl. No.: 68,392

[30] Foreign Application Priority Data

Sept. 1, 1969 Italy..................................53173 A/69

[52] U.S. Cl...........................................340/365, 178/17 C
[51] Int. Cl............................................................G08c 9/04
[58] Field of Search................................340/365; 178/17 C

[56] References Cited

UNITED STATES PATENTS 3,119,996 1/1964 Comstock............................340/365
3,160,875 12/1964 Bernard................................340/365
3,210,484 10/1965 Dorsey..................................340/365
3,457,368 7/1969 Houcke.................................340/365

Primary Examiner—Thomas B. Habecker
Attorney—Birch, Swindler, McKie & Beckett

[57] ABSTRACT

In a keyboard for calculating machines and the like having a magnetic circuit and means for generating a magnetic flux therein, a means operated by depressing the keys for causing a variation in the magnetic flux and detecting that variation including a ferromagnetic plate having a plurality of openings through which ferromagnetic elements can be caused to move by the action of the keys, and a plurality of detecting windings disposed about the openings in accordance with a predetermined digital code whereby an electromotive force is generated at the ends of the detecting winds when a ferromagnetic element moves through an opening in the ferromagnetic plate.

12 Claims, 7 Drawing Figures

INVENTORS
RICCARDO BRESCIA
LUCIO MONTANARI

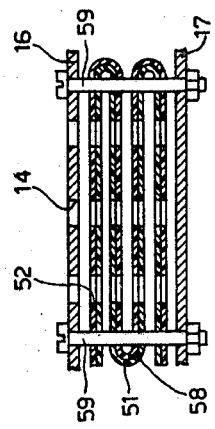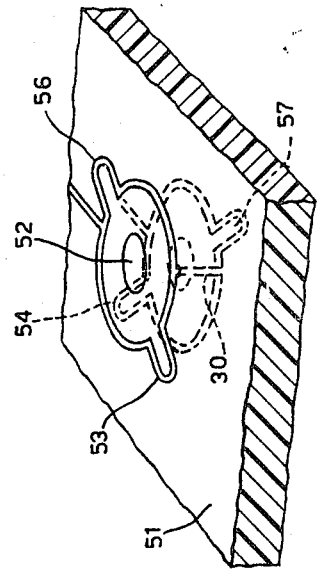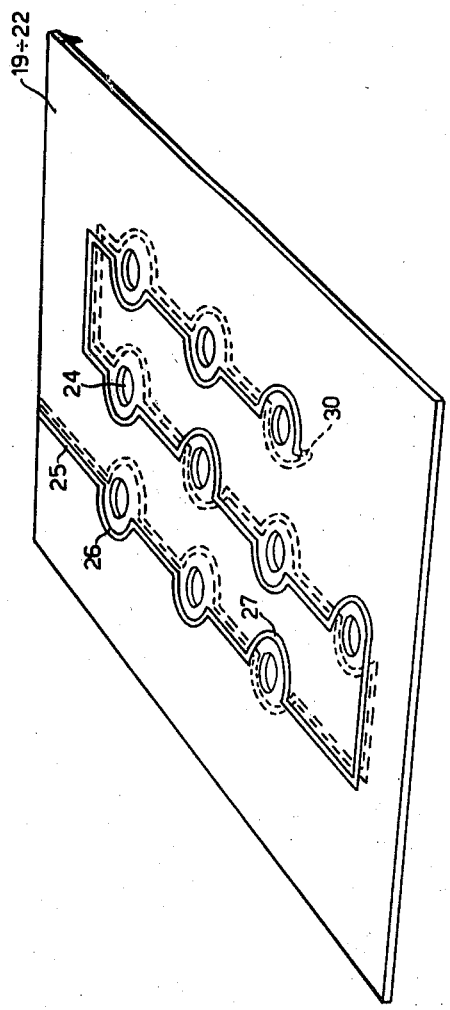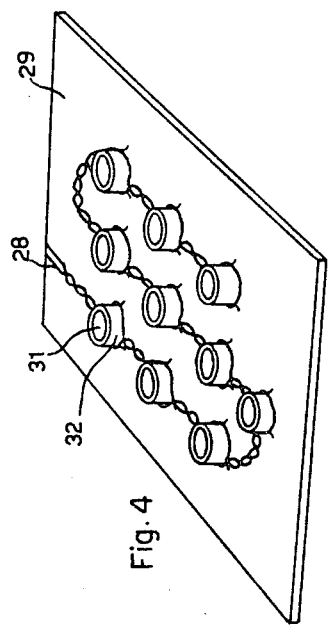

3,641,568

KEYBOARD FOR CALCULATING MACHINES, TELEPRINTERS, TERMINALS AND THE LIKE

BACKGROUND OF THE INVENTION

The present invention relates to a keyboard for calculating machines, teleprinters, data terminals and the like, of the type wherein the depression of a key varies the magnetic flux present in a magnetic circuit, means being provided for detecting the variation of the magnetic flux.

A number of keyboards for calculating machines and the like which utilize the principle of magnetic induction are already known. These known keyboards generally use as many independent magnetic circuits as they are keys; their structure is therefore rather complex and the assembly thereof is equally complex, with consequent problems of cost.

A keyboard of the magnetic-induction type in which the variation in magnetic flux produced by the depression of a key supplies a coded electric signal of binary type in a series of channels associated with the various keys is known. This keyboard, however, has the disadvantage that when a key remains pressed the coded signal put out persists; therefore, on pressing another key, an incorrect output would be obtained.

Also known is a magnetic-induction keyboard which enables a key to be actuated when the preceding key is still being pressed; this keyboard, however, is devoid of an encoding system and, like the one previously mentioned, is devoid of a system for recognizing the accidental simultaneous actuation of two keys.

SUMMARY OF THE INVENTION

According to the invention, there is provided a keyboard for calculating machines, teleprinters, data terminals and the like, comprising a plurality of keys controlling ferromagnetic elements, a magnetic circuit including means for generating a magnetic flux therein and a ferromagnetic plate with a series of holes in each of which, as a result of the actuation of a corresponding key, there slides the corresponding ferromagnetic element which is inserted in shunt in the magnetic circuit and thereby links with a plurality of detecting windings disposed in accordance with a digital code, there being generated at the ends of each of the detecting windings an E.M.F. induced by a variation in time of the magnetic flux in the ferromagnetic element during its insertion in shunt in the magnetic circuit.

BRIEF DESCRIPTION OF THE DRAWINGS

The following description relates to a preferred embodiment of the invention and is given, by way of example, with reference to the accompanying drawings, in which:

FIG. 3 shows in perspective a detail of the keyboard;
FIG. 4 shows in perspective a modified form of the detail of FIG. 3;
FIG. 6 shows in pErspective on a larger scale a detail of the keyboard according to the invention;
and
FIG. 7 shows a detail of the keyboard.

DESCRIPTION OF THE PREFERRED EMBODIMENTS

Figure 1:
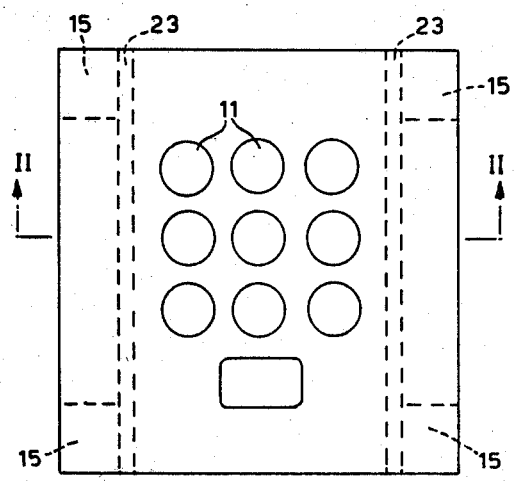
FIG. 1 is a plan view, partly in section, of a keyboard embodying the invention.
Figure 2:
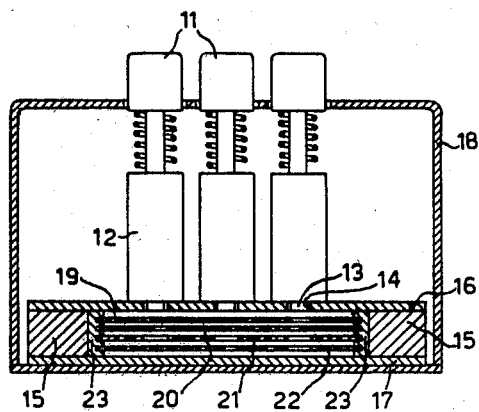
FIG. 2 is a section of FIG. 1 on the line II—II.

The embodiment of the invention which will be described is the numeral keyboard of a calculating machine comprising 10 keys 11 (FIG. 2) each associated by means of a release device 12 with a corresponding ferromagnetic core 13 which can slide in a corresponding hole 14 formed in a ferromagnetic plate 16. The magnetic circuit of the keyboard includes the parallel plates 16 and 17 of ferromagnetic material between which there are disposed peripherally a certain number of permanent magnets 15 (four in the drawing) which are magnetically in parallel; in place of the permanent magnets, electromagnets may be used and they function in a similar manner. The magnets 15 render each of the two ferromagnetic plates 16 and 17 magnetically equipotential and produce a difference of magnetic potential between them. To the plate 17 there is fixed a cover 18 in which are formed 10 holes from which the 10 keys 11 project.

Between the two plates 16 and 17 and parallel thereto there is disposed a set of boards 19 to 22 of insulating material, for example synthetic resin, which are spaced from one another. The boards 19 to 22 can be inserted in an equal number of slots formed in two spaces 23 fixed to the magnets 15, or may simply be superposed with the interposition of an insulating sheet between one board and the next to be pressed between the plates 16 and 17.

The number of boards 19 to 22 is equal to the minimum number of channels sufficient to define, in a binary code, all the keys present in the keyboard. Four channels define 16 binary combinations and are therefore sufficient to define the 10 keys 11 present on the keyboard.

In each of the boards 19 to 22 (FIG. 3) there are formed 10 holes 24 in correspondence with the holes 14 formed in the ferromagnetic plate 16. On each of the boards 19 to 22 of insulating material there is deposited a layer 25 of electrically conductive material, for example copper, which forms on each of the boards 19 to 22 a track or strip which passes around the holes 24 describing turns 26 in a sense conventionally assumed as positive and turns 27 in the other sense assumed as negative, according to the type of encoding. The layer of conductive material is deposited partly on one face and partly on the other face of each of the insulating boards 19 to 22 to form the outgoing and return conductors of each channel; at the end of the outgoing conductor there is an electrical connection 30 through the boards 19 to 22 with the return conductor deposited on the bottom face. Each turn formed around the holes 24 therefore lies half on the top face and half on the bottom face of the boards 19 to 22.

In this way, each of the 10 keys 11 is associated with a combination of four turns, one for each track 25, which pass or wind in a positive or negative manner around the axis of the key. The combination will be different for each of the keys 11 and characteristic of the key.

FIG. 4 shows a different embodiment of the detecting windings using electrically insulated wires 28 (only one of which is shown in the drawing) wound so as to form, in correspondence with the holes 14 in the ferromagnetic plate 16, windings with equal numbers of turns in a positive or negative sense and connected in series. The wires 28, the number of which is equal to the minimum number of channels which are sufficient to represent in a binary code the keys present on the keyboard, are disposed on a single insulating board 29 provided with holes 31, this board being similar to the boards 19 to 22 hereinbefore described and disposed between the two plates 16 and 17. A projection 32 around each of the holes 31 enables the wires 28 to be arranged on the board 29 and the wires may be fixed to the board 29 with, for example, a synthetic cement.

Figure 5:
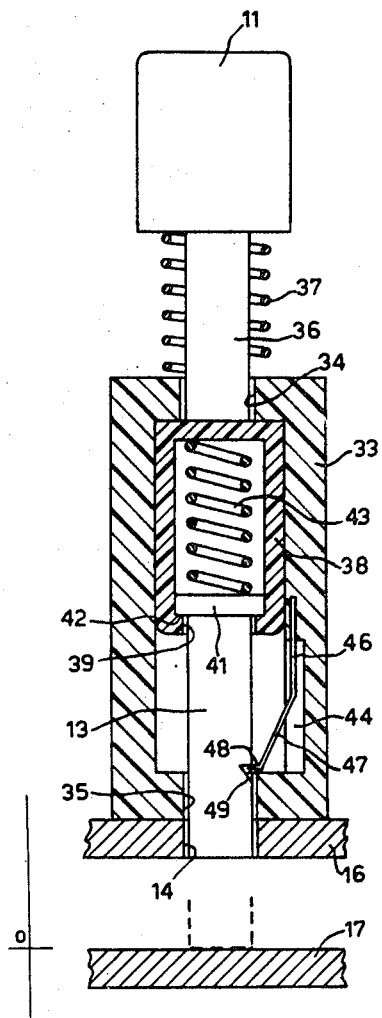
FIG. 5 shows on a larger scale a detail of the keyboard.

Ten release devices 12 are fixed to the plate 16 (FIG. 2) in correspondence with the holes 14, an embodiment of these devices being shown in FIG. 5 by way of indication of a principle of operation, this indication being nonlimitative, however. Each release device 12 has a cylindrical casing 33 having two holes 34 and 35 at its two ends. The shank 36 of a key 11 is slideable in the upper hole 34; between the key 11 and the upper base of the casing 33 there is located a spring 37 which holds the key 11 in its highest position. The lower end of the shank 36 is fixed to a hollow plunger 38 slideable in the casing 33. A hole 39 is formed in the lower base of the plunger 38. The head 41 of a cylindrical core 13 of ferromagnetic material can slide inside the plunger 38; the head 41, the diameter of which is larger than that of the core 14, cooperates with a stop rim 42 provided on the plunger 38 and preventing the core 13 from disengaging itself from the plunger 38. The lower end of the core 13 is guided by the hole 35 in the casing 33 and by the corresponding hole 14 in the plate 16. A spring 43 compressed between the inside of the upper end of the plunger 38 and the head of the core 13 holds the head 41 of the core 13 against the stop 42 of the plunger 38.

Fixed in the inner part of the wall of the cylinder 33 and housed in a groove 44 in the latter is a spring strip 46 and 48 which extends, in the portion 46, parallel to the direction of the stroke of the core 13, in the portion 47 diagonally and in the portion 48 perpendicularly to the first said direction. The portion 48 of the spring strip cooperates with a notch 49 in the core 13.

On actuating a key 11 (FIG. 5), the shank 36 and the plunger 38 are pushed downwardly, compressing the springs 37 and 43; the core 13 is in fact locked by the end 48 of the spring strip 46 and 48 inserted in the notch 49.

The outer face of the plunger 38 encounters the oblique portion 47 of the spring strip 46 and 48 during its stroke, thus bending the strip towards the interior of the groove 44 and disengaging the end thereof from the notch 49. The core 13 is thus released and, through the action of the spring 43, which expands, slides rapidly downwards, being inserted in the corresponding holes 24 in the printed boards 19 to 22 or in the hole 31 in the support 29 (according to the form of the detecting windings), being stopped against the ferromagnetic plate 17.

The ferromagnetic core 13 is therefore inserted in shunt in the magnetic circuit 15, 16 17 (FIG. 2) and modifies the course of the lines of magnetic flux, which now pass through it. There is thus obtained a sudden increase in the magnetic flux linked with the detecting windings 25 or 28 affected by the key 11 actuated; in fact, with the key raised, these windings were linked only with the leakage flux, which is practically zero. The increase in flux induces in the detecting circuits 25 or 28 a voltage proportional to the derivative with respect to time $d/dt$ of the flux and of sign dependent on the direction in which the detecting turns wind. We will refer to the wave form of the voltage induced in the detecting circuits as a "pulse" for brevity.

The variation of flux in time is proportional to the speed with which the core 13 slides downwardly; the sliding speed of the core 13 being independent of the manner in which the key 11 is depressed, the pulse of voltage induced in the detecting windings will always be the same whatever the speed with which the key 11 is actuated.

Therefore, according to whether in each track 25 or in each wire 28 there is a winding in a positive or negative sense in correspondence with the actuated key, a positive or negative voltage pulse will be obtained at the output of the same track. The combination of pulses at the output of the various tracks 25 will be characteristic of the key actuated and represents its code. The combination of the pulses, these being suitably amplified, can act on whatever part of the machine is to be controlled by the keyboard.

On releasing the key 11 and the spring 37, the end 48 of the spring strip 46 and 48 slides along the sloping side of the notch 49, locking the core 13 again. The release device is thus reset and ready to be released at any instant.

During the ascent of the ferromagnetic core 13, there is a fresh variation in the magnetic flux linked therewith; the flux changes this time from a finite value to a practically zero value due to the dispersions in air and, therefore, the variation is of opposite sign with respect to the preceding variation.

In the turns corresponding to the key 11 which is released there will therefore be obtained a voltage pulse of sign opposite to the useful signal which is obtained during the descent of the core 13, but also of very reduced value. This will be seen by a more detailed analysis of the phenomenon.

The electromotive force $E$ induced in the induction windings, assumed to be of $N$ turns, is expressed by the equation (1), in which $M$ indicates the magnetomotive force and $R$ the reluctance of the magnetic circuit:

$$E = N \frac{M}{R^2(t)} \frac{dR(t)}{dt} \quad (1)$$

The reluctance $R$ comprises a constant term $Ro$ and a term variable in time due to the airgap between the ferromagnetic core 13 and the plate 17, as is expressed by equation (2):

$$R = Ro + \frac{x(t)}{uS} = \frac{x(t) + K}{uS} \quad (2)$$

in which $x$ is the coordinate indicated in FIG. 5, $S$ is the area of the cross section of the core 13, us is the magnetic permeability of the material of which the core 13 is formed and $K$ is a suitable constant.

We have finally equation (3):

$$E = N \frac{M}{R(t)} \frac{v(t)}{x(t) + K} \quad (3)$$

in which $v$ is the instantaneous speed of the core 13.

The speed of the core 13 during the ascent is lower than during the descent, both because the resetting spring 37 has a coefficient of elasticity lower than that of the propelling spring 43 and because the mass which the spring 37 displaces during the ascent is greater than that displaced by the spring 43 during the descent of the core 13.

The maximum value of the useful voltage is obtained for $x=o$ when the core touches the plate, because $v$ reaches its maximum value and $R$ $(x+K)$ its maximum value. At the beginning of the ascent $v$ is very low and therefore $E$ has a value much lower than the useful voltage peak; at the end of the ascent, $v$ still has a value lower than that reached during the descent and furthermore the term $R(x+K)$ reaches its maximum value, and therefore $E$ has a value which is negligible with respect to the useful pulse. By making the spurious release pulse negligible, the risk of disturbances and errors is therefore avoided.

A keyboard of this type moreover permits the actuation of a key when the preceding key is still depressed. In fact, the signal in the detecting circuit is obtained only during the variations in magnetic flux and, therefore, a key may remain depressed indefinitely without a signal being obtained on that account in the detecting windings.

A problem which is posed in the case of the keyboard for calculating machines or writing machines or the like is that of being able to recognize the case of erroneous actuation of two keys at the same time. The logic described is used for this purpose by causing each turn of the track to wind, as hereinbefore stated, in a positive sense around the holes 24 to which, according to the code chosen, one binary value is made to correspond, and in a negative sense around the holes to which the other binary value is made to correspond.

With a system of windings of this kind, for any combination whatsoever of two keys there will always be at least one track which winds in a positive sense in correspondence with one key and in a negative sense in correspondence with the other key. Therefore, on depressing two keys together by mistake, there will be two voltage pulses which will cancel each other in correspondence with at least one track. It will therefore be possible to provide the keyboard with a device which generates an error signal when a "zero" level appears at the output of any track simultaneously with a level different to zero at the outputs of another track.

By adopting the system of windings printed on an insulating support, there can be conveniently used a single perforated and flexible insulating sheet 51 on which a standard circuit is printed by deposition of an electrically conductive layer. The standard circuit is constituted by turns of the type shown in FIG. 6, which wind around each hole 52 and are interconnected in series. Each turn is applied to the two faces of the sheet and has four projections 53, 54, 56, 57. By interrupting the projections 53 and 57, the turn winds in one sense around the corresponding hole 52, by interrupting the projections 54 and 56 the turn winds in the opposite sense. The interruption if the projections may be effected by means of a suitably programmed punch which cuts the desired projections. As stated hereinbefore, one half of each turn will extend on one face of the sheet and one half on the other face and in the section between two successive turns the electric circuit will lie in a plane perpendicular to that of the magnetic field, so as to minimize spurious linkages of magnetic flux.

The sheet 51 is then folded in several layers (FIG. 7) in such manner as to cause the holes in each layer to correspond and is inserted between the ferromagnetic plates 16 and 17, to which it is fixed, for example, by means of two bolts 59. An insulating sheet 58 superimposed on the sheet 51 and perforated in a like manner prevents the turns of adjacent layers of the sheet 51 from coming into contact.

By adopting the system of wound wires, it is possible to form more than one turn around each hole 31, with the advantage of obtaining electromotive forces of higher value. The windings in a positive or negative sense can be produced by a programmed machine.

We claim:

1. In a keyboard for calculating machines, teleprinters, data terminals and the like having a magnetic circuit and means for generating a magnetic flux therein, means for causing and detecting a variation in said magnetic flux in correspondence with the depression of each key of said keyboard comprising
   a ferromagnetic plate in said magnetic circuit, said ferromagnetic plate having a plurality of ferromagnetic plate openings therethrough a plurality of detecting windings disposed about said ferromagnetic plate openings in accordance with a predetermined digital code, and
   a plurality of ferromagnetic elements, each said ferromagnetic element being operatively attached to one of said keys and associated with one of said ferromagnetic plate openings, each said ferromagnetic element being movable through said associated ferromagnetic plate opening in response to the depressing of said key whereby an electromotive force is generated at the ends of said detecting windings.

2. A keyboard according to claim 1 wherein said detecting windings are printed upon a plurality of insulating boards substantially parallel to said ferromagnetic plate and having insulating board openings corresponding to said ferromagnetic plate openings, said ferromagnetic elements being movable through said insulating board openings.

3. A keyboard according to claim 1 wherein said detecting windings are printed upon a flexible insulating board having a plurality of insulating board openings, said flexible insulating board being folded in several layers such that said insulating board openings of said several layers are aligned with said ferromagnetic plate openings.

4. A keyboard according to claim 1 wherein said detecting windings comprise a plurality of insulated conducting wires anchored to a board substantially parallel to said ferromagnetic plate and having in alignment with said ferromagnetic plate openings an equal number of openings in which each of said ferromagnetic element can slide, each of said conducting wires describing a path which links said ferromagnetic board openings.

5. A keyboard according to claim 1 wherein each of said detecting windings links in opposite senses in correspondence with said keys with which there are associated, in corresponding digit of said digital code, opposite values of the binary variables.

6. A keyboard according to claim 5 further comprising means for generating an error signal when upon depressing of one of said keys the output of one of said detecting windings is substantially zero.

7. A keyboard according to claim 5 further comprising means for generating an error signal when, simultaneously, the output of one of said detecting windings is substantially zero and the output of another of said detecting windings is different from zero.

8. A keyboard according to claim 3 wherein each of said detecting windings comprises two turns in parallel linking in opposite senses in correspondence with each of said ferromagnetic plate openings, and metallic continuity of one of said two turns being interrupted according to the sense in which the detecting winding is desired to link the corresponding said ferromagnetic plate opening.

9. A keyboard according to claim 1 wherein in each of said ferromagnetic element is controlled by said associated key by means of a release device operated by depressing said key including means moving said ferromagnetic element through said ferromagnetic plate opening and said associated detecting windings at a first rate, and a resetting element withdrawing said ferromagnetic element when said key is released at second rate less than said first rate.

10. A keyboard according to claim 1 wherein said magnetic circuit comprises two substantially parallel ferromagnetic plates, at least one of said ferromagnetic plates having a series of openings and a series of elements generating a magnetic field disposed along the periphery of said ferromagnetic plates.

11. A keyboard according to claim 10 wherein said elements generating a magnetic field are permanent magnets.

12. A keyboard according to claim 10 wherein said elements generating a magnetic field are electromagnets.

* * * * *